(12) United States Patent
Weinberg et al.

(10) Patent No.: US 8,219,404 B2
(45) Date of Patent: Jul. 10, 2012

(54) METHOD AND APPARATUS FOR RECOGNIZING A SPEAKER IN LAWFUL INTERCEPTION SYSTEMS

(75) Inventors: Adam Weinberg, Netanya (IL); Irit Opher, Tel Aviv (IL); Eyal Benaroya, Rehovot (IL); Renan Gutman, Petach Tikva (IL)

(73) Assignee: Nice Systems, Ltd., Raanana (IL)

( * ) Notice: Subject to any disclaimer, the term of this patent is extended or adjusted under 35 U.S.C. 154(b) by 1016 days.

(21) Appl. No.: 11/836,213

(22) Filed: Aug. 9, 2007

(65) Prior Publication Data
US 2009/0043573 A1 Feb. 12, 2009

(51) Int. Cl.
*G10L 17/00* (2006.01)
(52) U.S. Cl. .......... 704/273; 704/250
(58) Field of Classification Search .......... 704/246–250, 704/273
See application file for complete search history.

(56) References Cited

U.S. PATENT DOCUMENTS

| | | | |
|---|---|---|---|
| 5,278,942 A * | 1/1994 | Bahl et al. ............ | 704/200 |
| 5,895,447 A * | 4/1999 | Ittycheriah et al. ...... | 704/231 |
| 6,067,517 A * | 5/2000 | Bahl et al. ............ | 704/256.4 |
| 6,107,935 A * | 8/2000 | Comerford et al. ...... | 340/5.52 |
| 6,529,871 B1 * | 3/2003 | Kanevsky et al. ........ | 704/246 |
| 6,754,628 B1 * | 6/2004 | Chaudhari et al. ....... | 704/246 |
| 7,231,019 B2 | 6/2007 | Pascovici | |

OTHER PUBLICATIONS

Douglas A. Reynolds—Robust Text Independent Speaker Identification Using Gaussian Mixture Speaker Models—IEEE Transactions on Speech and Audio Processing, vol. 3, No. 1, Jan. 1995.

* cited by examiner

*Primary Examiner* — Abul Azad
(74) *Attorney, Agent, or Firm* — Ohlandt, Greeley, Ruggiero & Perle, L.L.P.

(57) ABSTRACT

A method and apparatus for identifying a speaker within a captured audio signal from a collection of known speakers. The method and apparatus receive or generate voice representations for each known speakers and tag the representations according to meta data related to the known speaker or to the voice. The representations are grouped into one or more groups according to the indices. When a voice to be recognized is introduced, characteristics are determined according to which the groups are prioritized, so that the representations participating only in part of the groups are matched against the voice to be identified, thus reducing identification time and improving the statistical significance.

32 Claims, 4 Drawing Sheets

METHOD AND APPARATUS FOR RECOGNIZING A SPEAKER IN LAWFUL INTERCEPTION SYSTEMS

BACKGROUND OF THE INVENTION

1. Field of the Invention

The present invention relates to voice analysis in general, and to a method and apparatus for identifying an unknown speaker, in particular.

2. Discussion of the Related Art

Traditional lawful interception relies mainly on intercepting phone calls of known targets, for which warrants had been issued. Modern lawful interception comprises intercepting interactions made by additional communication means used by the known targets, including computerized sources such as e-mails, chats, web browsing, VOIP communications and others. The process of monitoring a target includes analysis of the captured information and related meta data using a variety of technologies, displaying different data sources on the same platform, and managing the entire workflow of one or more investigators. In the common scenario, one of the parties of the intercepted phone call or another vocal communication, such as the audio part of a video conference, is usually known to the investigators, while the other party is not necessarily known. It is also possible that multiple parties are unknown, for example in a conference call, or when speakers in any of the parties change during the communication exchange, or when another person is using the communication device associated with a person under surveillance. However, there is a possibility that the other, i.e., the unknown party is involved in other cases investigated by that or another law enforcement agency or is otherwise known to such agency. In such cases it would be desirable to identify the unknown speaker or speakers, so that additional relevant information can be associated and processed with the interaction or with other information related to the target, i.e. the person whose interactions are being intercepted.

Unlike speaker verification problems, in which it is required to verify whether a given voice matches a specific stored voice representation, voice print or voice sample, in speaker identification problems it is required to identify the speaker from a collection typically having between tens and hundreds of thousands of voices. An alternative scenario is in a call center, a trading floor or another organizational unit participating in vocal interactions. In such calls, one side of the call, being the agent or another representative of the organization is known, while the other side is a-priori unknown. When the unknown speaker identifies, it is possible to verify his or her identity. However, if the verification fails, it is desirable to know the real identity, or at least receive additional information related to the speaker. Identifying the caller may assist in preventing fraud actions and other crimes.

Speaker identification is optionally performed by generating for each known or available speaker, a representation of the speaker, being or including a mathematical entity such as a statistical model, that represents the characteristics of the speaker's voice, and storing the representation. The characteristics may include acoustic as well as non-acoustic characteristics. Yet it is possible also to store features, such as samples of the stored voice or some features extracted from the voice as part of the model associated with the speaker. As an example, such presentation can be a statistical model such as Gaussian Mixture Model (GMM), adaptive GMM (AGMM), a vector of features or the like. Then, when a voice sample to be identified is given, it is tested against the stored representations and if the caller is identified with one or more representation, he or she is assigned to be the speaker, or one of a list of speakers, whose representation best matches the characteristics of the unknown caller. The voice sample itself is preferably represented as a parameterized representation of the voice. Otherwise, the caller is determined as an unknown speaker.

The process introduces a number of problems. First, the time required for such a process is generally proportional to the size of the voice collection, and can therefore be too long for providing effective results, especially when a large volume of calls is to be analyzed continuously, or when the analysis result is required urgently or in real time. Moreover, the identification performance degrades and its statistical significance decreases as the number of voices in the collection grows. Yet another problem is that the speakers voice is not guaranteed to be in the collection, in which case it is preferable to not associate the voice at all than associate it with the wrong speaker.

There is thus a need in the art for speaker identification method and apparatus, which will enable the identification of a speaker from a multiplicity of known speakers, in an environment of an organization such as law enforcement to institutes, security departments of call centers, or financial institute, or any other organization. The method and apparatus should be efficient so as to enable the identification of a speaker in real-time or near-real-time, in order to provide organizations or other users with the ability to react efficiently. The method and apparatus should also provide high performance, i.e. low error rate.

SUMMARY

The disclosed method and apparatus enable the enable speaker identification in monitoring environment. The method and apparatus provide for generating groups of models. Then, in a preferred embodiment, when a voice sample is to be recognized, it's acoustic and non-acoustic score against one or more groups or one or more models is determined, thus optionally reducing the number of models the voice sample is compared to.

In accordance with the disclosure, there is thus provided a method for associating a voice of a first speaker, the voice extracted from a captured audio signal, with one or more of a multiplicity of speakers, each of the multiplicity of speakers associated with an acoustic model and with data, the method comprising the steps of: receiving or extracting the data associated with each of the multiplicity of speakers; tagging the acoustic model associated with each of the multiplicity of speakers according to one or more parameters associated with the is acoustic model or with a second voice sample the acoustic model is associated with or with a speaker of the second voice sample; constructing according to the tagging one or more groups comprising an acoustic model; determining one or more matched groups to be matched against the voice of the first speaker; determining one or more non-acoustic scores between data related to the first speaker, and the matched groups or one or more acoustic models from the matched group; determining one or more acoustic scores between the voice of the first speaker and one or more acoustic models from the matched group; obtaining a total score by combining the non-acoustic score with the acoustic score; determining according to the total score whether an identification criteria was met; and if the identification criteria was met, associating the first speaker with the model from the matched group. The method optionally comprises the step of constructing the acoustic model. The method can further comprise the step of determining a relative order between the group and one or more second groups. Within the method, the data associated with each of the multiplicity of speakers is optionally meta data related to any of the multiplicity of speakers or to the acoustic model. The one or more parameters can relate to the acoustic model or to data associated with one or more of the multiplicity of speakers. Within the method, the step of constructing the groups is optionally performed by considering the models or the associated data. Within the method, the tagging can be performed according to a level of connectivity between a second speaker the first speaker was communicating with, and one or more of the multiplicity of speakers. The tagging can also be performed according to a time of communication between a second speaker the first speaker was communicating with, and one or more of the multiplicity of speakers, or according to a predetermined group of speakers. Any of the parameters optionally relate to any one or more of the group consisting of: identity of a speaker in the second voice sample; age of a speaker in the second voice sample; accent of a speaker in the second voice sample; language spoken by a speaker in the second voice sample; a feature of the at least one voice model; data extracted from the second voice sample; level of connectivity between a speaker in the second voice sample and another speaker; a word used by a speaker in the second voice sample; a name mentioned by a speaker; a location associated with a speaker in the second voice sample; a phone number or part thereof associated with a speaker in the second voice sample; a pronunciation of a phoneme by a speaker in the second voice sample; a characteristic of a channel used by a speaker in the second voice sample; and a time of a communication of a speaker in the second voice sample. Within the method, the data related to the first speaker optionally relates to any one or more of the group consisting of: identity of the first speaker; age of the first speaker; accent of the first speaker; language spoken by the first speaker; a characteristic of the voice models; data extracted from the voice sample; level of connectivity between the first speaker and a second speaker the first speaker was communicating with; a word used by the first speaker; a name mentioned by the first speaker; a location associated with the first speaker; a phone number or part thereof associated with first speaker; a pronunciation of one or more phonemes by the first speaker; a characteristic of a channel used by the first speaker; and a time of a communication of the first speaker. The audio signal is optionally in a format selected from the group consisting of: PCM, a-law, mu-law, GSM, CDMA, TDMA, ADPCM and VOIP.

Another aspect of the disclosure relates to an apparatus for associating a voice of a first speaker, the voice extracted from a captured audio signal, with one or more of a multiplicity of speakers, each of the multiplicity of speakers associated with an acoustic model and with data, the apparatus comprising: a storage device for storing the acoustic model and associated meta data; a capturing or logging component for receiving a voice sample of the first speaker to be identified; a tagging component for tagging the acoustic model according to an at least one parameter associated with the acoustic model or with a second voice sample the acoustic model is associated with or with a speaker of the second voice sample; a selection component for selecting a matched group comprising one or more matched models or one or more models for matching with the voice sample of the first speaker to be identified; a non-acoustic score determination component, for determining a non-acoustic score between data related to the first speaker, and the matched groups or one or more acoustic models from the matched groups; an acoustic score determination component for determining an acoustic score between the voice of the first speaker and an acoustic model from the matched groups; a combining component for combining the acoustic score and the non-acoustic score into a total score; and a criteria evaluation component for determining whether the total score meets one or more criteria. The apparatus can further comprise a group determination order for determining a matching order between at least two groups, or a model determination order for determining a matching order between two or more models belonging to the same group. The apparatus optionally comprises a model generation component for generating an acoustic model from a voice sample, or a data extraction component for extracting data related to a voice sample or to a speaker thereof. The apparatus can further comprise an alert generation device for generating an alert when the first speaker is identified as one or more of the multiplicity of speakers. The apparatus optionally comprises a result reporting component for reporting a result related to matching the first speaker and the matched models. Within the apparatus, the data associated with each of the multiplicity of speakers is optionally meta data related to any of the multiplicity of speakers or data relating to the acoustic model. The parameters can relate to the acoustic model or to data associated with any of the multiplicity of speakers. The captured audio signal can represent any one or more items selected from the group consisting of: a phone conversation; a voice over IP conversation; an audio part of a video conference; a radio broadcast; an audio part of a television broadcast; and a captured microphone. The captured audio signal is optionally in to a format selected from the group consisting of: PCM, a-law, mu-law, GSM, CDMA, TDMA, ADPCM and VOIP. Within the apparatus, the associated meta data can relate to a level of connectivity between a second speaker the first speaker was communicating with and a speaker associated with the voice models. Within the apparatus, the parameters optionally relates to any one or more of the group consisting of: identity of the speaker of the second voice sample; age of the speaker of the second voice sample; accent of the speaker of the second voice sample; language spoken by the speaker of the second voice sample; a feature of the voice model; data extracted from the voice sample; level of connectivity between the speaker of the second voice sample and a second speaker the speaker of the second voice sample was communicating with; one or more words used by the speaker of the second voice sample; one or more names mentioned by the speaker of the second voice sample; a location associated with the speaker of the second voice sample; a phone number or part thereof associated with a speaker of the second voice sample; a pronunciation of phonemes by a speaker of the second voice sample; a characteristic of a channel used by speaker of the second voice sample; and a time of a communication of a speaker of the second voice sample. Within the apparatus, the data related to the first speaker can relate to any one or more of the group consisting of: identity of the first speaker; age of the first speaker; accent of the first speaker; language spoken by the first speaker; a feature of the voice model; data extracted from the second voice sample; level of connectivity between the first speaker and another speaker; a word used by the first speaker; a name mentioned by the first speaker; a location associated with the first speaker; a phone number or part thereof associated with the first speaker; a pronunciation of a phoneme by the first speaker; a characteristic of a channel used by the first speaker; and a time of a communication of the first speaker. Within the apparatus, the tagging is optionally performed according to a level of connectivity between a second speaker the first speaker was communicating with, and one or more of the multiplicity of speakers, or according to a time of communication between a second speaker the first speaker was communicating with, and one or more of the multiplicity of speakers, or according to a predetermined group of speakers.

Yet another aspect of the disclosure relates to a method for associating a voice of a first speaker, the voice extracted from a captured audio signal, with one or more of a multiplicity of speakers, each of the multiplicity of speakers associated with an acoustic model and with meta data, the method comprising the steps of: constructing one or more groups of models, each one of the groups of models comprising the acoustic model and the meta data associated with one of a multiplicity of speakers; matching the voice of the first speaker with all models belonging to the one or more groups of models to obtain a score; and associating the first speaker as a speaker associated with one of the multiplicity of speakers for which the score meets a predetermined criteria.

BRIEF DESCRIPTION OF THE DRAWINGS

The disclosed subject matter will be understood and appreciated more fully from the following detailed description taken in conjunction with the drawings, in which corresponding or like numerals or characters indicate corresponding or like components. In the drawings.

DETAILED DESCRIPTION

Figure 1:
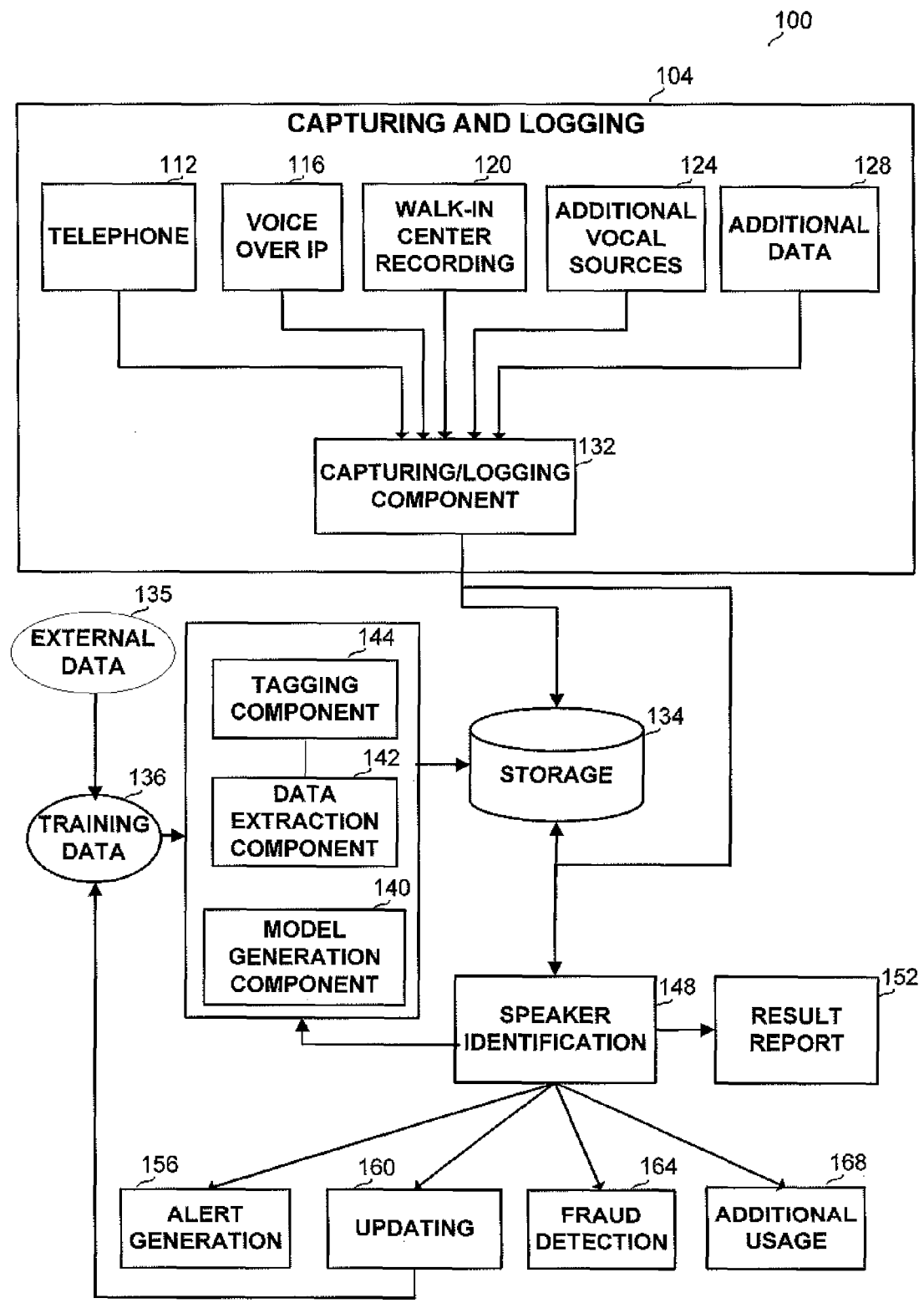
FIG. 1 presents a block diagram of the main components of a typical environment in which the disclosed subject matter is used.

The disclosed subject matter provides a method and apparatus for speaker identification in an environment in which vocal interactions are captured or recorded. The interactions can take any form of communication between two or more parties, wherein at least one party comprises an at least one person.

In some of the interactions, one side is usually known, be it a target being intercepted by a law enforcement agency according to a warrant, an agent in a call center, a trader in a trading floor or the like. When the need rises to identify unknown speaker or speakers, whether for intelligence purposes, for fraud detection and prevention purposes, or any other purposes, speaker recognition is performed. In the disclosed method and apparatus, acoustic representations are constructed from available voice samples. The representations can take any form, for example models, which are also referred to as voice models. The terms representation, model and voice model are thus used interchangeably, and unless otherwise noted, the term model relates to any representation of the voice. The models, as well as available meta data are stored and tagged in a storage such as a database. When an interaction containing a voice to be identified is captured, the stored models or some of them are divided into groups, wherein each group is constructed based on one or more criteria. The common denominator can be captured-interaction-independent, in which case the group can alternatively be determined a-priori when the models are stored and tagged. Other common denominators can relate to the specific captured interaction and thus some of the groups can only be determined dynamically, i.e. when a speaker in the interaction is to be recognized. Any two groups can contain each other, partly overlap, or be disjoint. After constructing the groups and defining an order in which the groups are to be matched with the voice, the voice to be identified is matched against all models in one or more groups rather than to all models in the collection. Each comparison takes into account the matches between the voice or any of its characteristics, and the specific model or models it is matched against. The matches may include acoustic matches and non-acoustic matches, the non-acoustic matches relating to the meta data or to characteristics extracted from the voice.

After testing the voice to be identified against one or more voice models within one or more groups, it is determined whether an acceptance criterion is met. A criterion can be a combination of a few simpler criteria. If the criterion is met, then the speaker is identified with the speaker of the best matching model. Otherwise more matches are performed, whether against models belonging to the already matched groups or additional groups. The process continues until a stopping criterion is met. Then either one or more speakers are identified as candidates to being the speaker in the interaction, or it is declared that the speaker in the interaction was not identified.

Referring now to FIG. 1, which presents a block diagram of the main components in a typical environment in which the disclosed subject matter is used. The environment, generally referenced 100, is an interaction-rich organization, typically an interception center of a law enforcement organization, a call center, a trading floor, another financial institute, a public safety contact center, or the like. Alternatively, the environment can be a telephone line, a mobile telephone line or any other device which receives interaction in which a speaker is to be identified. In the case of a telephone device, the disclosed subject matter can be used as a caller ID implementation.

Voices of intercepted targets, customers, users or other contacts are captured, thus generating input information of various types. The information types include vocal interactions, non-vocal interactions and additional data, such as Call Detail Record (CDR), Computer Telephony Integration (CTI), demographic details and others. The capturing of voice interactions can employ many forms and technologies, including trunk side, extension side, summed audio, separate audio, various encoding and decoding protocols such as G711, G729, G726, G723.1, ISAC, ACELP, AMR and the like. The vocal interactions usually include interactions made over a telephone 112, which is currently the main communication channel. Telephone 112 may be a landline telephone, a cellular, satellite or another mobile telephone, a voice over IP (VoIP) telephone or any other voice communication device. Additional information, such as Call Detail Record (CDR) may be collected from the source of the vocal information as well as from separate sources. A typical environment can further comprise voice over IP channels 116, which possibly pass through a voice over IP server (not shown). The interactions can further include face-to-face interactions, such as those recorded in a walk-in-center 120, and additional sources of vocal data 124, such as microphone, intercom, the audio part of video capturing, vocal input by external systems such as radio broadcasting, television broadcasting, or any other source. In addition, the environment comprises additional non-vocal data of various types 128. For example, Computer Telephony Integration (CTI) used in capturing telephone calls, can track and provide data such as number called from, DNIS, VDN, ANI, number and length of hold periods, transfer events, number called, or the like. Additional data can arrive from external sources such as law enforcement monitoring systems, billing, CRM, or screen events, including data, texts, documents and the like. The data can include links to additional interactions in which a known speaker in the current interaction participated. Another type of data includes data extracted from vocal interactions, such as spotted words, emotion level, speech-to-text or the like. Data from all the above-mentioned sources and others, and in all formats, including but not limited to PCM, a-law, mu-law, GSM, CDMA, TDMA, ADPCM, VOIP, or other existing formats or formats that will be known in the future, is captured and preferably logged by capturing/logging unit 132. Capturing/logging unit 132 receives the data and outputs an audio signal representing the captured interaction, broadcasting or the like. The captured interaction or broadcast signal comprises the voice of one or more speakers. Capturing/logging unit 132 comprises a computing platform executing one or more computer applications as is detailed below. The captured data is optionally stored in storage device 134, comprising one or more mass storage devices, for example an optical storage device such as a CD, a DVD, or a laser disk; a magnetic storage device such as a tape or a hard disk; a semiconductor storage device such as flash device, memory stick, or the like. The storage can be common or separate for different types of captured interactions and different types of additional data. Alternatively, the storage can be remote from the site of capturing and can serve one or more sites of a multi-site organization. Storage 134 further stores acoustic models of the voices of targets, users or other known or unknown speakers, and their tags. For generating the models and tagging data, the environment receives training data 136 comprising voice prints or voice samples and additional data preferably regarding the samples, such as the identity of the speaker, demographic data or others. Training data 136 is preferably collected from the same sources as detailed above 112, 116, 120, 124 and 128. Alternatively, training data 136 can be obtained from a source external to the system, such as external data 135. Training data 136 is transferred to model generation component 140 which generates the acoustic models to be stored in storage 134. In a preferred embodiment of the disclosed subject matter, the model of a voice is a statistical model, comprising statistical measures of features extracted from the voice. Training data 136 is further transmitted to data extraction component 142 which extracts or receives meta data or other data related to the voices or to the speakers thereof, or to the training process. Tagging component 144 analyzes the data extracted or received by data extraction so component 142 and generates tags for the data. The tagging component creates entries or values related to a speaker representation or to other characteristic of a speaker, based on related information such as meta data or acoustic information to be used for retrieval or grouping. Thus, the stored data relating to the training material comprises the voice models, as well as tagged information, comprising acoustic features, meta data, and features extracted from the voice such as spotted words. For example, extracting and storing as tags the gender, age, language, accent or other characteristics of the speaker, enables the retrieval of all models that belong to male or female speakers, or have another predetermined value for a certain characteristic. The processed training data, including the models and tagging information are also stored in storage 134. Speaker identification component 148 receives the captured or logged interactions from capturing/logging component 132 or from storage 134. If speaker identification component 148 receives non-stored interactions from capturing/logging components 132, then the output of speaker identification component 148 can be useful in determining whether the interactions are to be stored in storage 134. Thus, speaker identification component 148 can receive on-line audio streams, for example in a monitoring environment, or off-line audio files or streams. In yet another alternative, the speaker identification can be initiated interactively upon a user's request. Thus, a user may be reviewing an interaction, mark one of the speakers and ask for identification of that speaker. The user may also mark one or more segments of one or more interactions in which a speaker is participating. In such cases, the user may further select one or more groups of models, or indicate a certain (acoustic or non acoustic) characteristic or characteristics according to which groups are selected to be matched against the voice. Groups can further be constructed ad-hoc during identification, for example by a user indicating criteria to be met. Speaker identification component 148 can be activated for any interaction captured, or for a subset of the interactions. The interactions upon which identification will be performed can be selected by testing one or more rules, such as "all calls initiated from a certain telephone number", by the occurrence of an event such as at least three speakers in an interaction, or any other criteria. Identification can further be performed for known speakers, for testing, verification and calibration of the system. Identification can be performed for one or more speakers in an interaction, which may also be decided by a rule, for example a rule stating that the calling person should only be identified if this person is not verified to be a known resident where the call was initiated from.

Speaker identification component 148 optionally extracts data from the voice using data extraction component 142 or constructs a model of each captured voice using model generation component 140, or otherwise extracts voice or speaker characteristics. Speaker identification component 148 then determines or receives one or more groups of models from storage 134 to which the voice print or voice model should be compared. Speaker identification component 148 compares the characteristics of the captured voice, or a model built upon the captured voice to the models in the groups, in one or more iterations. In a preferred embodiment of the disclosed subject matter, the characteristics of the voice are compared against the one or more selected models. In another preferred embodiment, a model of the voice to be tested is first constructed, and then the constructed model is compared to the one or more selected models in the groups. When one or more candidate speakers are identified, or it is determined that the captured voice is not related to any of the persons whose voice prints are available in training data 136, the result is reported by result reporting component 152. Result reporting component 152 reports the result in a report, message, or any other fashion. The identity or other details of the candidate speaker can further be transferred to alert generation component 156, which generates an alert. The alert can take any form, such as sending an e-mail, fax, SMS, telephone message or another notification to a person in charge, updating a database or other actions. The person in charge preferably receives also the speaker's voice, with or without with the entire conversation and the identity of the target set member suspected to be the speaker. The speaker's identity is further optionally transferred to updating component 160, which updates or otherwise improves or enhances the model or the tagging data associated with the speaker, based, for example on recently captured voice prints or meta data available. Component 160 further enables a user to validate a model associated with a user for correctness, update or other factors. Further usages of the speaker's identity are fraud detection component 164, which is operative in preventing fraud actions and to any additional usage 168, such as supplying information about the voice prints or speakers thereof for further analysis, playback applications, collecting information for statistics purposes, or the like. All components of the system, including capturing/logging components 132 and speaker identification component 148, preferably comprise one or more computing platforms, such as a personal computer, a mainframe computer, a network computer, or any other type of computing platform that is provisioned with a memory device (not shown), a CPU or microprocessor device, and several I/O ports (not shown). For implementing the disclosed subject matter, the computing platforms execute one or more applications, being logically inter-related collections of computer instructions, such as executables, modules, static libraries, dynamic libraries, scripts or other units and associated data structures that interact or the like, programmed in any programming language such as C, C#, C++, Java. VB or the like, and under any development environment, such as .NET, J2EE, or others. Alternatively, the components described above, can be implemented as firmware ported for a specific processor such as digital signal processor (DSP) or microcontrollers, or can be implemented as hardware or configurable hardware such as field programmable gate array (FPGA) or application specific integrated circuit (ASIC).

It will be appreciated by a person skilled in the art that all applications or components, including capturing and logging components 132, model generation component 140, tagging component 144, speaker identification component 148 or others can be co-located and executed on the same one or more computing platform, or on different platforms. In yet another alternative, the information sources and capturing platforms can be located on each site of a multi-site organization, and one or more application components can be remotely located, identify speakers in interactions captured at one or more sites and store the identification results in a local, central, distributed or any other storage.

Figure 2A:
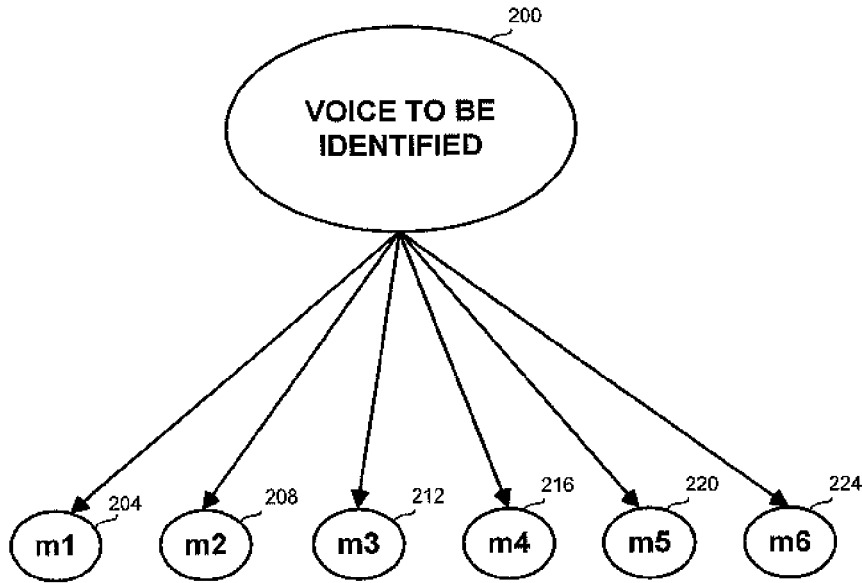
FIG. 2A is a schematic illustration of the method of the prior art.
Figure 2B:
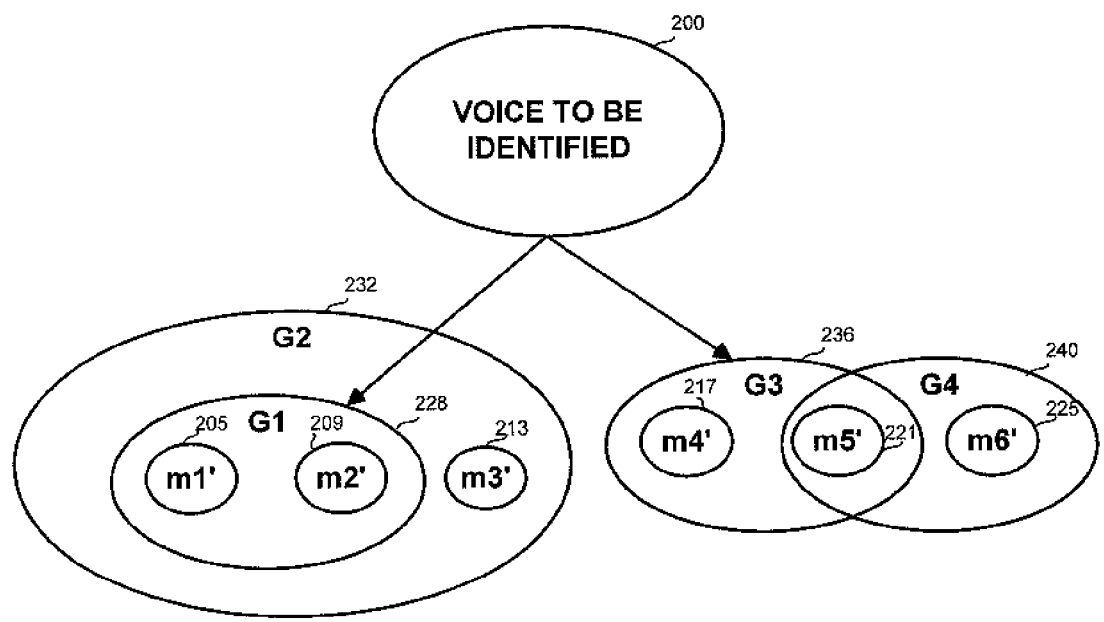
FIG. 2B is a schematic illustration of a preferred embodiment of the disclosed method.

Referring now to FIGS. 2A and 2B, illustrating the differences between traditional identification and the disclosed subject matter. In FIGS. 2A and 2B, it is required to identify the speaker in a voice to be identified 200. In FIG. 2A there are six candidate speakers whose voices were earlier introduced to the system, and models were constructed upon them, the models being m1 (204), m2 (208), m3 (212), m4 (216), m5 (220), and m6 (224). In traditional methods, voice 200 or a model constructed according to voice 200 is compared to all six models. Then, a user can either select one or more models having the highest match with voice 200, select all models whose match with voice 200 exceeds a predetermined threshold, reject voice 200 and declare that no match was found if none of the models had a match exceeding a predetermined threshold with voice 200, or the like. Referring now to FIG. 2B, illustrating the implementation of the disclosed method and apparatus. Each voice is accompanied by related meta data, so that the enhanced models m1' (205), m2' (209), m3' (213), m4' (217), m5' (221), and m6' (225) either contain or are attached to additional data. The meta data can relate to any accompanying information related to a speaker, to a communication the speaker participated in, to a medium of communication, such as a device, a channel or the like, to information external to any communication, to patterns of to communication, to one or more speakers, or to content derived from voice of one or more speakers, the demographics of the speaker, such as gender, age, languages used by the speaker, accent, the area where the person lives or is likely to visit, phone numbers of places he visits often, channels used often, or the like; the acoustic characteristics of the voice, such as pitch, energy, phoneme duration, hesitation patterns, or others; data extracted from the voice, such as spotted words, emotional levels; or additional factors, such as general data regarding the system, connection between entities and targets through hierarchical structure and through intercepted events in the system, or the like. Additional information may relate to the level of connection to a certain person, i.e. the models of all people who communicated directly with a certain person are comprised in the first circle and are assigned a certain score, models of all people who communicated with people in the first circle, i.e., are in the second cycle of the certain person are assigned another score, and so on for additional levels of connection between the person to be identified and speakers of voice models to be tested. The additional information may alternatively relate to timing of communication made by a speaker, to predetermined groups of speakers, or the like. The data is tagged according to any parameter, so when it is required to identify a given voice, it is possible to retrieve a group containing all models that adhere to a certain characteristic. Thus, models 205, 209, 213, 217, 221 and 225 are grouped according to one or more parameters, into group G1 (228) comprising m1' (205) and m2' (209), G2 (232) comprising m1' (205), m2' (209) and m3' (213), G3 (236) comprising m4' (217) and m5' (221), and G4 (240) comprising m5' (221) and m6' (225). The groups can contain each other like G2 (232) and G1 (228), overlap partly like G3 (236) and G4 (240) or fully, or be disjoint like G1 (228) and G3 (236). The grouping can be according to one or more parameters, for example gender, language, accent, or age, wherein certain age groups contain smaller age groups relating to smaller ranges of ages. The groups can further be created once voice 200 is provided, according to voice 200 or to a characteristic associated with the interaction in which the person having voice 200 participates. Thus, some groups can be created a-priori, according to characteristics of the models in the group or meta data associated with speakers whose models in the group, while others can only be created dynamically according to a characteristic of the voice to be identified or to the captured audio signal. A characteristic for dynamic group creation can be for example, a communication time, a location, an address or part thereof, a phone number or part thereof such as an area code, or the like associated with the speaker to be identified, with another speaker participating in the interaction, or with another characteristic of the interaction or broadcasting. For example, if the captured interaction was initiated from an area having area code X, the grouping can classify voice models of persons known to be resident in that area from all other areas. In another example, the grouping can select only persons who are known be connected directly or indirectly via one or more middle persons to a known speaker in the interaction. Another example relates to one or more groups constructed according to the respective speakers using a certain word, group of words, intonation or other acoustic or acoustically derived information, or any statistical data. Once the groups are determined, the testing order between the groups and within each group can be determined. Then, voice 200 is compared against the models in one or more groups. If a candidate whose match with voice 200 meets a predetermined criterion is located within the tested groups, the process stops, otherwise additional one or more groups are tested. For example, if G1 (228) is the first group to be tested and G3 (236) is the second, then only if no satisfactory candidate was found in G1 (228) will G3 (236) be tested. This reduces the number of models each voice is tested against, thus reducing the identification time and enhancing the operational significance of the results, i.e. allows the user to receive possible identifications in cases where identification was impossible, were the voice print to be compared against all models in the system.

Figure 3:
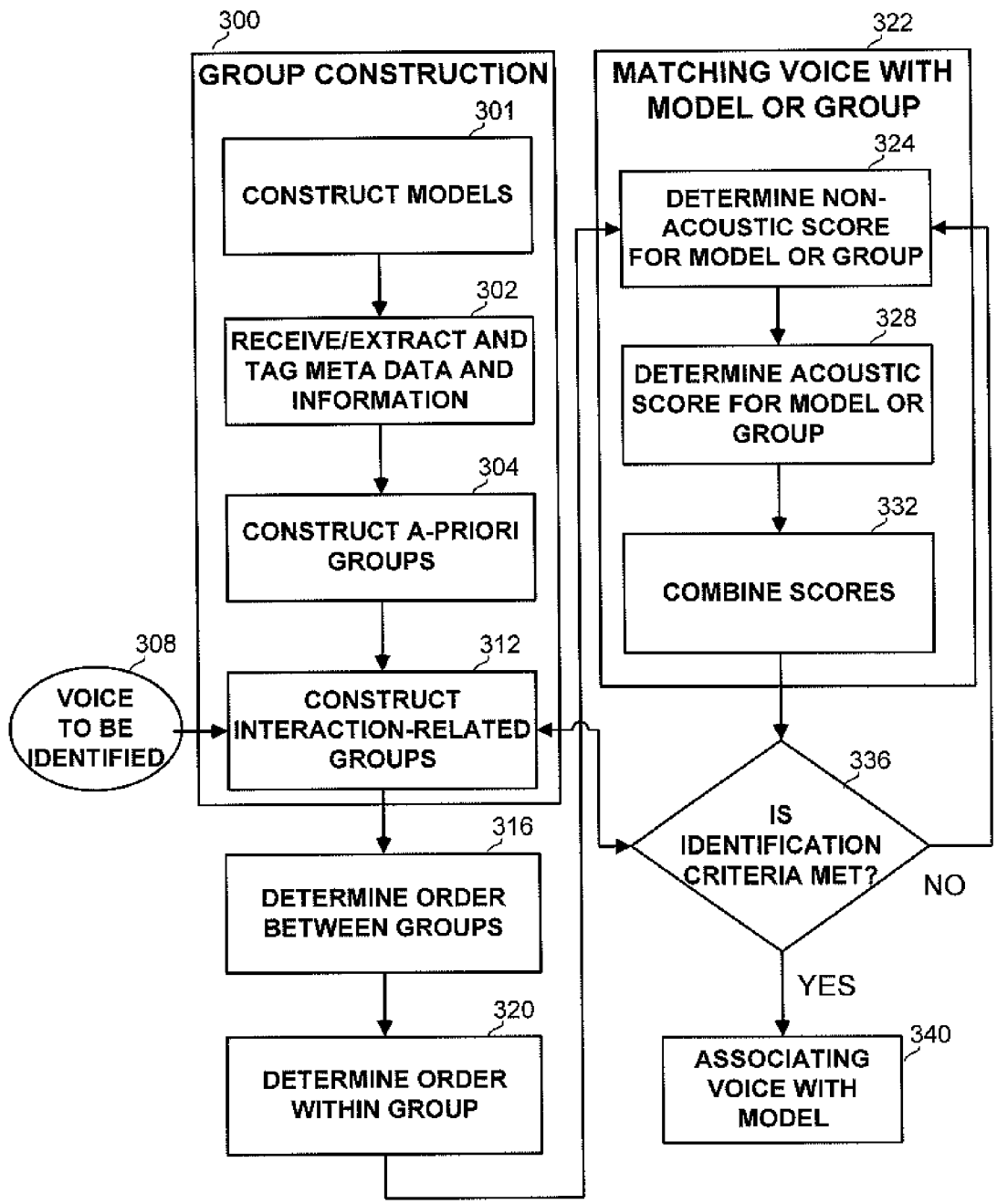
FIG. 3 is a flowchart of the main steps in a preferred embodiment of the disclosed method.

Referring now to FIG. 3, showing a flowchart of the main steps in a preferred embodiment of the disclosed method. The method comprises steps 300 for constructing a-priori or dynamically a grouping of a collection of existing models. Each voice to be identified is then compared to one or more of the groups rather than to all the models in the collection. The method further comprises steps 322 for determining a score of a match between the voice to be identified and a certain model or group. The score can comprise one or more preferably numeric values representing a match, arranged as a number, a vector, a table or the likes Steps 300 include step 301 for constructing models, step 302 for extracting meta data and tagging the models, and steps 304 and 312 for constructing a-priori or dynamic groups of models. On step 301 acoustic models are constructed for each of the available voice prints or voice samples. If necessary, the voice print undergoes preprocessing which preferably includes actions for enhancing the voice quality, such as speaker segmentation when multiple speakers are captured, noise reduction, channel separation, format conversion, decoding, handling various compressions or any other required preprocessing. A meaningful voice model can be constructed only if a minimal duration of the voice print is available, and if the voice print is of sufficient quality. Thus, voice prints shorter then the predefined minimal duration, or of low quality are preferably ignored or stored for later use when additional or better data is captured. Multiple models are optionally constructed for one or more speakers, for example when the speaker's voice is captured in different environments or different communication channels, or the like. Exemplary implementations of model construction step 301, as well as acoustic score determination step 328 are detailed in U.S. Pat. No. 5,895,447 issued on Apr. 20, 1999 to Ittycheriah et al., titled Speech Recognition Using Thresholded Speaker Class Model Selection or Model Adaptation. On step 302 meta data is received or extracted for the voices for which acoustic models were constructed on step 301. The acoustic models are tagged according to parameters related to the meta data, such as location data or demographic data known from external sources or according to parameters extracted from the models. The meta data and tagging information are stored together or in association with the voice representations. Preferably, the speaker of each voice is known, but even if not, associating further interactions with such target may be useful. Thus, exact identification of the speaker is not necessary. The meta data can be received from an external source such as an area code associated with the speaker, raw data retrieved from the voice, such as pitch, or additional data retrieved from the voice, such as age group, gender, or the like. On optional step 304, a-priori groups are constructed according to the meta data extracted or received for the voices on step 302. Groups can be constructed according to any field or item of the metadata associated with the voice. Steps 301, 302 and 304 are preferably performed as preparation steps, before voices are presented for identification. Alternatively, the steps are repeated for more voices as such voices are accumulated. When a voice is presented to the system and is not recognized, its model is preferably added to the collection of voice models, and tagged according to available data, such as call time, call content, voice characteristics, language, number called from or the like. On step 312, once a voice to be identified 308 is introduced, interaction-related groups can be constructed. For example, if the person whose voice it is required to identify was captured when speaking with one or more second persons, a first group to be matched can be of people who are known to have communicated during a recent predetermined period of time with the second person or person. A second group can be of people who are known to have spoken during a possibly different recent predetermined period of time with a third person or persons who have spoken with the second person or persons, and so on. Multiple second persons exist, for example, if the voice of the person to be identified was captured in a conference call, in a multi party call, or in a call where the speakers change during the conversation. Since at least one group has to be constructed, step 304 or 312 can be skipped, but not both. Each model preferably belongs to multiple groups. For example, a model can belong to the group of male voices, the group of older voices, and a group of speakers having low pitch. On step 316 the groups are prioritized in relation to the specific voice to be recognized. For example, the group containing the persons known to have spoken with the other person receives high priority, while the group of people having indirect connection with the other person receives lower priority, or the like. In a preferred embodiment, data extraction can be performed on the voice to be recognized, using different voice analysis processes, such as emotion detection or word spotting in order to prioritize the groups. On step 320 the order of matching the models within each group is optionally determined. If no specific order is determined, the voice models within the group will be matched with the voice to be recognized in an arbitrary order.

Score determination steps 322 determine a score of a match between the voice to be identified and a model or a group of models. Steps 322 comprise non-acoustic score determination step 324, acoustic score determination step 328 and score combination step 332. On step 324 a non acoustic score is determined as a function of the match between the voice to be tested and a specific model or a group. For example, if the voice to be recognized is a male voice, the models belonging to the group of male speakers will receive a higher non-acoustic score than voices in the group of female speakers. The non-acoustic score can be relevant to a specific voice model in a group, or to all voices in a group. Alternatively, the non-acoustic score can relate to meta data related to the voice to be tested, such as phone number from which the voice was captured, or the like. On step 328 an acoustic score is determined between the voice to be tested and at least one voice in an at least one group who was assigned high priority than other groups in step 316. The acoustic score can be determined by comparing two voice representations, or by comparing a voice sample to a representation. The acoustic score can relate to features of the voice, as well as content derived from the voice, such as spotted words. On step 332 the non-acoustic score determined on step 320 and the acoustic score determined on step 324 are combined into a total score using a predetermined combination, such as sum, weighted average, or any other function. On step 336 it is determined whether the combined score determined on step 332 meets identification criteria. If such criteria are met, the process ends on step 340 with one or more voice speakers associated with voice models being candidates for the speaker to be identified. The candidates are either passed to manual or other further testing, or are otherwise handled, according to the user's specifications. Alternatively, it may be the case that no candidate was located, in which case the speaker is declared to be new to the system, and possibly a voice model is generated for the speaker as detailed in step 301 above. If no criterion is met, and additional matches can be performed, the method returns to step 324. Alternatively, another process can be initiated if required, such as speaker hunting process when it is required to collect all communications in which a specific speaker speaks (whether or not the speaker is known. In yet another alternative, additional groups can be constructed by re-visiting step 312 during the identification process. The new groups can be constructed based on acoustic characteristics of the voice to be identified, relevant meta data or information extracted from the voice. Step 324 is re-visited for performing matches with additional voice models related to the same group or groups, with voice models belonging to additional one or more groups, with the same model but different matching parameters, or the like. The identification criteria can be whether the total score for a specific model exceeded a predetermined value. An alternative criterion is if all voices in one or more groups have been matched. In such case, the speakers associated with a predetermined number or a predetermined percentage of the models in the one or more groups having the highest matches are the candidates to the speaker. A yet alternative criterion is that none of the non-acoustic score for all groups or for all models exceeds a predetermined value, so the probability of locating a match in any of these groups is low. When multiple models are available for the same speaker, any combination or a function of the scores between the voice to be analyzed and the models relating to the same person may be considered when identifying the voice to be analyzed.

It will be appreciated by a person skilled in the art that the order of some of the steps of the flowchart of FIG. 3 can be changed, such as step 324 for determining the non-acoustic score of a model or group, and step 328 for determining the acoustic score for a model or group. Step 324 and 328, for example, can be performed in any required order, or in parallel without deviating from the spirit of the disclosed method. It will be further appreciated that the distinction between step 324 and 328 is not absolute. For example, the score related to spotted words can be determined either as part of the non-acoustic score or as part of the acoustic score. Also, as detailed above, any one or more of group construction steps 300 can be activated during matching steps 322. Thus, if during identification the user decides to test the voice to be identified against all models having a specific characteristic, a group of all these voices is constructed and the voice is matched with them.

Figure 4:
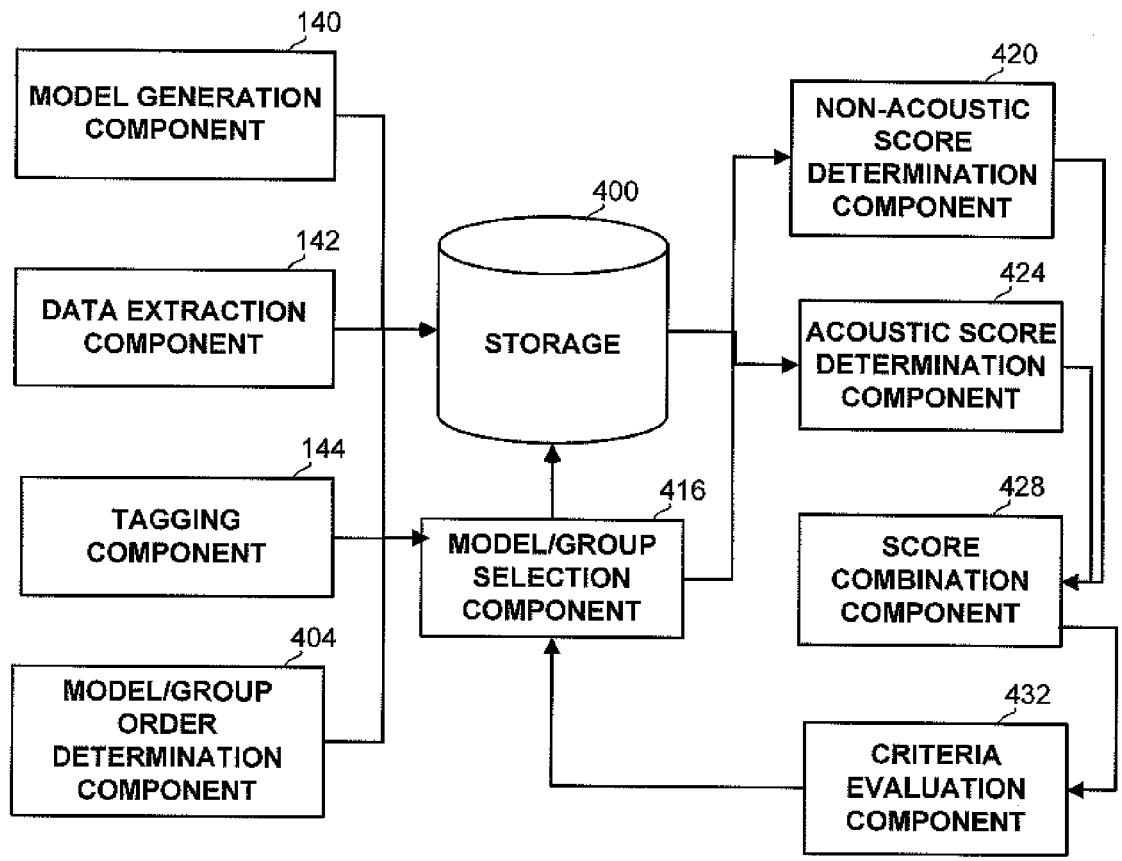
FIG. 4 is a block diagram of the main components in a preferred embodiment of the disclosed apparatus.

Referring now to FIG. 4, showing a preferred embodiment of an apparatus for identifying a speaker within a large collection of candidates. The apparatus comprises a storage device 400, which stores the models of the candidate's voices, and additional information regarding the models and the speakers. Storage device 400 optionally comprises one or more interconnected devices, for example an optical storage device such as a CD, a DVD, or a laser disk; a magnetic storage device such as a tape or a hard disk; a semiconductor storage device such as Flash device, memory stick, or the like. The apparatus further comprises model generation component 140, data extraction component 142 and tagging component 144 detailed in association with FIG. 1 above. The apparatus further comprises model/group order determination component 404, for determining the priorities, or the matching order between the groups or between any two models within each group. The priorities or the matching order determine in which order the groups should be selected and in which order the voice models within the groups should be matched against a voice to be tested. Determining the model order within a group can be skipped and replaced with an arbitrary order. While generation component 140, data extraction component 142 are used when a new voice or voice model is to be introduced to the storage, tagging component 144 and model/group order determination component 404 can also be used when a specific voice to be identified is introduced.

The apparatus further comprises model or group selection component 416, for selecting the group or model having the highest priority to be matched, which have not been matched yet. The model or group is selected according to the priorities determined by model/group order determination component 404. Further components of the apparatus are non-acoustic score determination component 420, which determines the match between a voice to be identified and a specific model or a group, based on meta data such as gender, age, previous communications, connections to other speakers or the like. The meta data can be is content derived such as spotted words, or non acoustic, such as demographic data. The score can be specific to a stored model or relate to the group as a whole. The score can be of a predefined range, such as a score related to previous communication between speakers which takes into account the number of middle persons that are known to connect between the speakers. For other factors, the score can change continuously and receive any of an unlimited number of values.

Acoustic score determination component 424 determines the acoustic match between the voice to be identified and each model against which it is tested, based on the voice features according to which the model is constructed. Score combination component 428 combines the non-acoustic score determined at step 420 and the acoustic score determined at step 424. Criteria evaluation component 432 tests whether the accumulated scores meet a stopping criterion. If the stopping criterion is met, i.e., there are no candidates and no point in performing additional matches, there is one candidate which is treated as the true speaker, or there are multiple candidates which should be further examined or otherwise handled. If no stopping criterion is met, model or group selection component 416 provides the next group or the next model to be matched. If no more groups or models are available to be matched, then no identification is reported.

The disclosed method and apparatus enable the efficient and effective identification of a voice to be identified with one or more of a collection of available voice models. The voice models are tagged according to all available data. The data preferably includes meta data not extracted from the voice itself but rather from external sources. Based on the tagging data the models are divided into groups, and the priorities of matching the voice to be identified against the model groups are determined. If a satisfactory match is found within the tested groups, the process stops, otherwise it may continue to further groups, according to priorities and resource allocation considerations. Thus, each voice is matched only against a fraction of the models, thus reducing identification time, as well as reducing the error rate and increasing the statistical significance of the recognition. It will be appreciated that the grouping of the models can be done either a-priori by taking into account the voice models or the associated meta data, or dynamically during the identification process, once a voice to be identified is given.

It will be appreciated by a person skilled in the art that there are numerous modifications and enhancements to the disclosed subject matter. For example, the distinction between acoustic and non-acoustic matching can be changed, by storing for each voice model also acoustic information which is to be tested separately from matching the acoustic models. For example, it is possible to classify the pitch feature of a voice into a predetermined number of groups, and tag the models according to the groups. Then when a voice to be identified is introduced, its pitch is determined and the voice model is matched only against models from the relevant pitch group. In addition, features which can be defined either as acoustic or as non-acoustic can be used, such as speech rate. Such features can be stored as tagging information or as part of the voice models. Additional features which can be used are related to products of processing, such as spotted words, emotional levels or the like. If, for example a speaker is known to make extensive use of a word, spotting this word within an interaction can narrow down the number of models to be tested. In addition, analyzing the voice to be identified, for example by transcribing and looking for names of peoples, places or the like can narrow down the search as well. For example, if the speaker says "I'm in city X", then the search can be initially limited to persons known to live, visit or are otherwise associated with city X. Thus, any information available about the speakers associated with the stored voice models can be used as tagging data for defining groups, whether a-priori or dynamically and narrowing the search.

It will be appreciated that a system according to the disclosure is preferably equipped with security management modules, for enabling each user to view only records and data he or she has sufficient privileges for. Similarly, only users having appropriate privileges are allowed to change or update models, is enhance meta data or make other changes.

While preferred embodiments of the disclosed subject matter have been described, so as to enable one of skill in the art to practice the disclosed subject matter. The preceding description is intended to be exemplary only and not to limit the scope of the disclosure to what has been particularly shown and described hereinabove. The scope of the disclosure should be determined by reference to the following claims.

What is claimed is:

1. A method for associating a voice of a first human speaker with at least one of a multiplicity of speakers, each of the multiplicity of speakers associated with an acoustic model and with data, the method comprising the steps of:
   capturing an audio signal of the first human speaker communicating with a second human speaker and extracting the voice of the first human speaker;
   receiving or extracting the data associated with each of the multiplicity of speakers;
   generating tags associated with each of the acoustic models of the multiplicity of speakers; wherein the tags represent an at least one parameter associated with the acoustic model of the speaker and with at least one parameter associated with the acoustic models of persons who are known to be connected directly or indirectly via one or more middle persons to a known speaker in the interaction;
   constructing one or more groups comprising acoustic models of speakers based on tag value similarity;
   determining an order for the groups by giving high priority to groups with persons who have direct connection with the first speaker or the second speaker and lower priority to groups with persons having indirect connection to the first speaker or the second speaker;
   selecting at least one group to be matched against the voice of the first speaker;
   determining an at least one non-acoustic score between data related to the first speaker, and the tags of the at least one matched group or the tags of an at least one acoustic model from the at least one matched group;
   determining an at least one acoustic score between the voice of the first speaker and an at least one acoustic model from the at least one matched group;
   obtaining a total score by combining the non-acoustic score with the acoustic score;
   determining according to the total score whether an identification criteria was met; and
   if the identification criteria was met, associating the first speaker with the at least one model from the matched group.

2. The method of claim 1 further comprising the step of constructing the acoustic model.

3. The method of claim 1 wherein the data associated with each of the multiplicity of speakers is meta data related to any at least one of the multiplicity of speakers.

4. The method of claim 1 wherein the data associated with each of the multiplicity of speakers relates to the acoustic model.

5. The method of claim 1 wherein another parameter relates to the acoustic model of the speaker.

6. The method of claim 1 wherein generating tags is performed according to a level of connectivity between the second speaker the first speaker was communicating with, and an at least one of the multiplicity of speakers.

7. The method of claim 1 wherein generating tags is performed according to a time of communication between the second speaker the first speaker was communicating with, and an at least one of the multiplicity of speakers.

8. The method of claim 1 wherein generating tags is performed according to a predetermined group of speakers.

9. The method of claim 1 wherein the at least one parameter relates to any one or more of the group consisting of: characteristics of a second speaker that communicated with the speaker from the multiplicity of speakers; identity of the second speaker; age of the second speaker; accent of the second speaker; language spoken by the second speaker; a feature of the acoustic model of the second speaker; data extracted from a voice sample of the second speaker; level of connectivity between the speaker and the second speaker; levels of connectivity between the second speakers and persons they are interacting with; an at least one word used by the second speaker; an at least one name mentioned by the second speaker; a location associated with the second speaker; a phone number or part thereof associated with the second speaker; a pronunciation of an at least one phoneme by the second speaker; a characteristic of a channel used by the second speaker; and a time of an at least one communication of the second speaker.

10. The method of claim 1 wherein the data related to the first human speaker relates to any one or more of the group consisting of: identity of the first human speaker; age of the first human speaker; accent of the first human speaker; language spoken by the first human speaker; a characteristic of the at least one voice model; data extracted from the voice sample; level of connectivity between the first speaker and the second human speaker the first speaker was communicating with; levels of connectivity between the second human speakers and persons they interact with; an at least one word used by the first human speaker; an at least one name mentioned by the first human speaker; a location associated with the first human speaker; a phone number or part thereof associated with first human speaker; a pronunciation of one or more phonemes by the first human speaker; a characteristic of a channel used by the first human speaker; and a time of an at least one communication of the first human speaker.

11. The method of claim 1 wherein the audio signal is in a format selected from the group consisting of: PCM, a-law, mu-law, GSM, CDMA, TDMA, ADPCM and VOIP.

12. The method of claim 1 wherein constructing one or more groups is performed according to geographic proximity of the speakers to a location from which the first human speaker is communicating.

13. The method of claim 1 wherein constructing one or more groups is performed according to words used by the speakers.

14. The method of claim 1 wherein constructing one or more groups is performed according to geographic proximity of the speakers to a location mentioned by the first human speaker.

15. An apparatus for associating a voice of a first human speaker, with at least one of a multiplicity of speakers, each of the multiplicity of speakers associated with an acoustic model and with data, the apparatus comprising:

a storage device for storing the acoustic model and associated meta data;

a capturing or logging component for receiving a voice sample of the first human speaker extracted from a captured audio signal of a communication between the first human speaker and a second human speaker;

a tagging component for generating tags associated with the acoustic models of the multiplicity of speakers; wherein the tags represent an at least one parameter associated with the acoustic model of the speaker and with at least one parameter associated with the acoustic models of persons who are known to be connected directly or indirectly via one or more middle persons to a known speaker in the interaction; and for constructing one or more groups comprising acoustic models of speakers based on tag value similarity;

a selection component for determining an order for the groups by giving high priority to groups with persons who have direct connection with the first speaker or the second speaker and lower priority to groups with persons having indirect connection to the first speaker or the second speaker; and selecting a group comprising an at least one acoustic model for matching with the voice sample of the first speaker;

a non-acoustic score determination component, for determining a non-acoustic score between data related to the first speaker, and the tags of the at least one matched group or the tags of an at least one acoustic model from the at least one matched group;

an acoustic score determination component for determining an acoustic score between the voice of the first speaker and an at least one acoustic model from the at least one matched group;

a combining component for combining the acoustic score and the non-acoustic score into a total score; and a criteria evaluation component for determining whether the total score meets an at least one criteria.

16. The apparatus of claim 15 further comprising a group determination order for determining a matching order between at least two groups.

17. The apparatus of claim 15 further comprising a model determination order for determining a matching order between at least two models belonging to the same group.

18. The apparatus of claim 15 further comprising a model generation component for generating an acoustic model from a voice sample.

19. The apparatus of claim 15 further comprising a data extraction component for extracting data related to a voice sample or to a speaker thereof.

20. The apparatus of claim 15 further comprising an alert generation device for generating an alert when the first speaker is identified as at least one of the multiplicity of speakers.

21. The apparatus of claim 15 further comprising a result reporting component for reporting a result related to matching the first speaker and the at least one matched model.

22. The apparatus of claim 15 wherein the data associated with each of the multiplicity of speakers is meta data related to any at least one of the multiplicity of speakers.

23. The apparatus of claim 15 wherein the captured audio signal represents any one or more items selected from the group consisting of: a phone conversation; a voice over IP conversation; an audio part of a video conference; a radio broadcast; an audio part of a television broadcast; and a captured microphone.

24. The apparatus of claim 15 wherein the captured audio signal is in a format selected from the group consisting of: PCM, a-law, mu-law, GSM, CDMA, TDMA, ADPCM and VOIP.

25. The apparatus of claim 15 wherein the associated meta data relates to an at least one level of connectivity between the second human speaker the first human speaker was communicating with and an at least one speaker associated with the voice models.

26. The apparatus of claim 15 wherein the at least one parameter relates to any one or more of the group consisting of: characteristics of the second speaker that communicated with the speaker from the multiplicity of speakers; identity of the second speaker; age of the second speaker; accent of the second speaker; language spoken by the second speaker; a feature of the acoustic model of the second speaker; data extracted from a voice sample of the second speaker; level of connectivity between the speaker and the second speaker; levels of connectivity between the second speakers and persons they communicate with; one or more words used by the second speaker; one or more names mentioned by the second speaker; a location associated with the second speaker; a phone number or part thereof associated with the second speaker; a pronunciation of one or more phonemes by the second speaker; a characteristic of a channel used by the second speaker and a time of an at least one communication of the second speaker.

27. The apparatus of claim 15 wherein the data related to the first speaker relates to any one or more of the group consisting of: identity of the first speaker; age of the first speaker; accent of the first speaker; language spoken by the first speaker; a feature of the at least one voice model; data extracted from the second voice sample; level of connectivity between the first speaker and another speaker; an at least one word used by the first speaker; an at least one name mentioned by the first speaker; a location associated with the first speaker; a phone number or part thereof associated with the first speaker; a pronunciation of an at least one phoneme by the first speaker; a characteristic of a channel used by the first speaker; and a time of an at least one communication of the first speaker.

28. The apparatus of claim 15 wherein the tagging is performed according to a level of connectivity between the second speaker the first speaker was communicating with, and an at least one of the multiplicity of speakers.

29. The apparatus of claim 15 wherein the tagging is performed according to a time of communication between the second speaker the first speaker was communicating with, and an at least one of the multiplicity of speakers.

30. The apparatus of claim 15 wherein the tagging is performed according to a predetermined group of speakers.

31. A method for associating a voice of a first human speaker with at least one of a multiplicity of speakers, each of the multiplicity of speakers associated with an acoustic model and with data, the method comprising the steps of:

capturing an audio signal of the first human speaker communicating with a second human speaker and extracting the voice of the first human speaker and the second human speaker;

receiving or extracting the data associated with each of the multiplicity of speakers;

generating tags associated with each of the acoustic models of the multiplicity of speakers; wherein the tags represent an at least one parameter associated with the acoustic model of the speaker and with at least one parameter associated with the acoustic models of persons who are known to be connected directly or indirectly via one or more middle persons to a known speaker in the interaction;

constructing one or more groups comprising acoustic models of speakers based on tag value similarity;

determining an order for the groups by giving high priority to groups with persons who have direct connection with the first speaker or the second speaker and lower priority to groups with persons having indirect connection to the first speaker or the second speaker;

selecting at least one group to be matched against the voice of the first speaker or voice of the second speaker according to the group order; and associating the first speaker or the second speaker with the at least one model from the matched group.

32. The method of claim 31 wherein the associating is performed by determining an at least one non-acoustic score between data related to the first speaker, and the tags of the at least one matched group or the tags of an at least one acoustic model from the at least one matched group;

determining an at least one acoustic score between the voice of the first speaker and an at least one acoustic model from the at least one matched group;

obtaining a total score by combining the non-acoustic score with the acoustic score;

determining according to the total score whether an identification criteria was met; and if the identification criteria was met, associating the first speaker with the at least one model from the matched group.

* * * * *